DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 7, 1972

896 O.G. 19

T896,017

THERMOFORMING LAMINAR FOAM STRUCTURES

Leon Edward Wolinski, Buffalo, N.Y., assignor to E. I. du Pont de Nemours and Company, Wilmington, Del.

Continuation of abandoned application Ser. No. 861,478, Sept. 26, 1969. This application Jan. 28, 1971, Ser. No. 110,769

Int. Cl. B29d *27/00*

U.S. Cl. 264—321

No Drawing. 8 Pages Specification

Process for thermoforming film/foam/film laminar structures by heating the laminar structure, forming it with at least one mold, heating the resulting formed structure to at least the second order transition temperature of the foam and less than the temperature at which the foam undergoes cellular collapse, and restraining the expansion of the laminar structure while maintaining the outer walls thereof at a temperature at least 10 centigrade degrees below the second order transition temperature of the foam.